June 26, 1956  L. Q. HINES, SR., ET AL  2,751,834
VERTICALLY SHIFTABLE TRACTOR WEEDER
Filed March 18, 1952  2 Sheets-Sheet 1
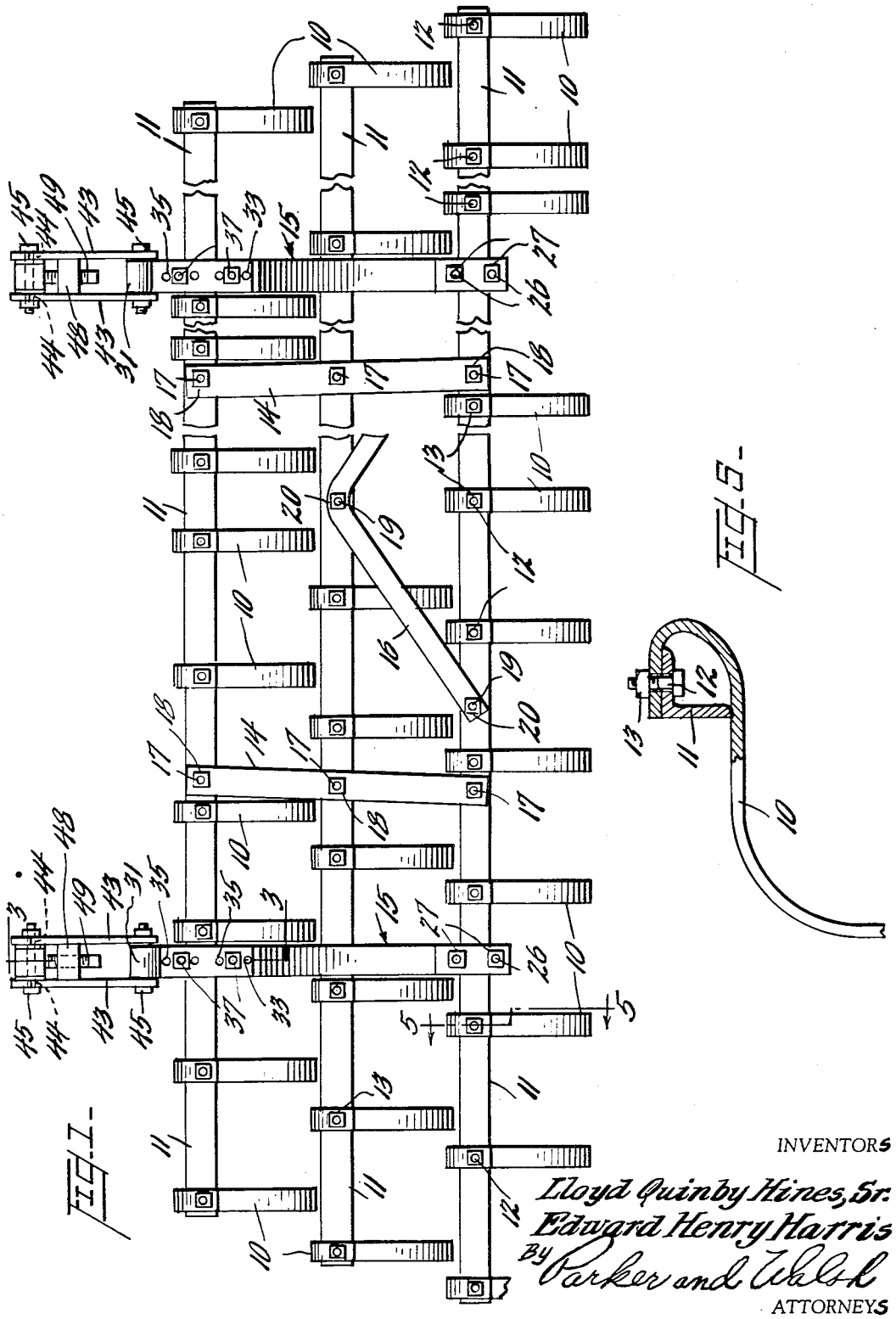
INVENTORS
Lloyd Quinby Hines, Sr.
Edward Henry Harris
BY Parker and Walsh
ATTORNEYS

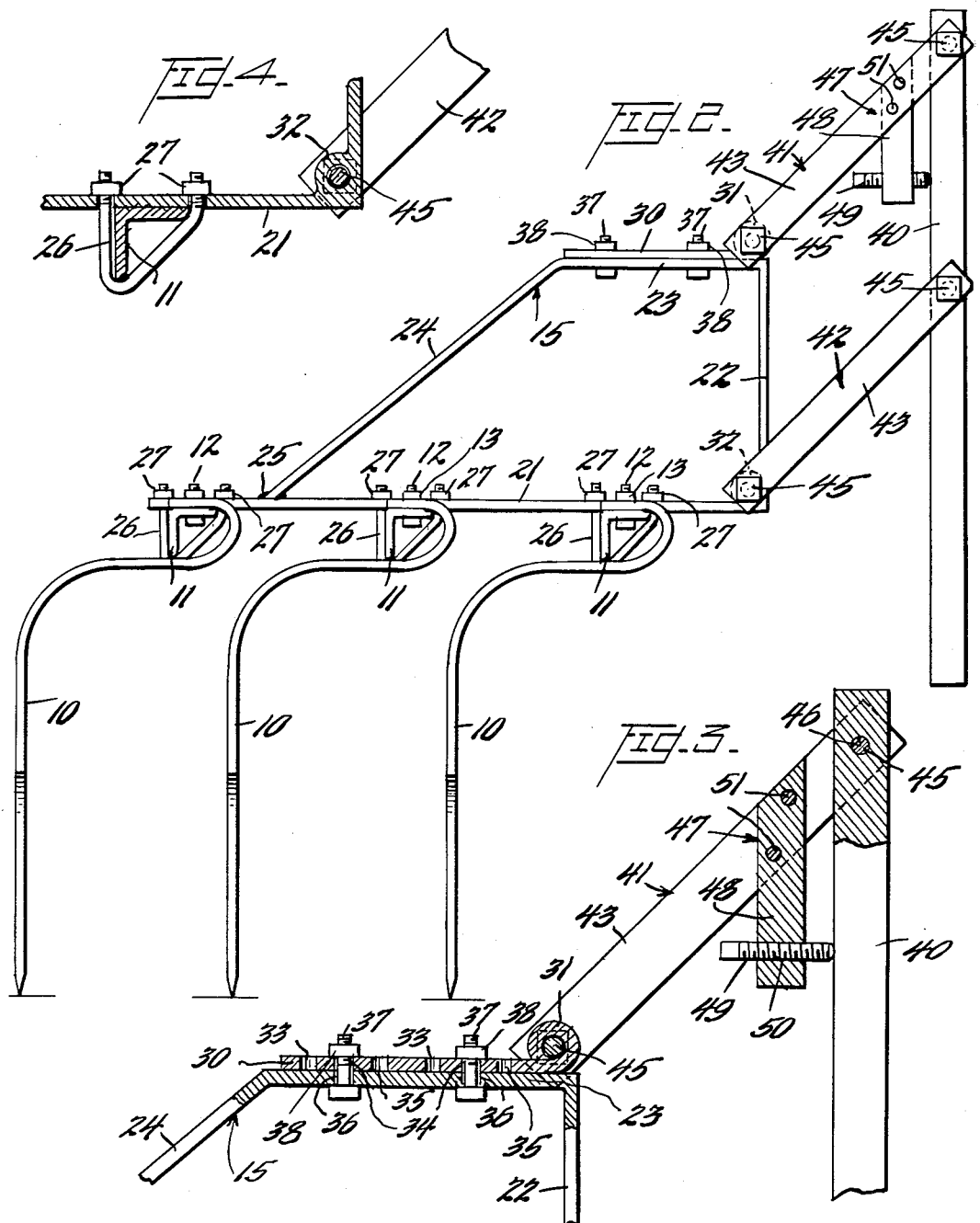

United States Patent Office 2,751,834
Patented June 26, 1956

2,751,834

VERTICALLY SHIFTABLE TRACTOR WEEDER

Lloyd Q. Hines, Sr., and Edward Henry Harris, Suffolk, Va., assignors to The Ferguson Manufacturing Company, Inc., Suffolk, Va., a corporation of Virginia Application March 18, 1952, Serial No. 277,248

4 Claims. (Cl. 97—47.5)

This invention relates to agricultural implements and more particularly to implements of this type designed for attachment to tractors or other prime movers.

A principal object of the invention is the provision of an agricultural implement having a plurality of ground engaging elements wherein adjustable supporting means are provided for limiting downward movement of the ground engaging elements while permitting free upward swinging movement of such elements and their supporting frame.

A further object of the invention is the provision of improved supporting means for an agricultural implement having a plurality of ground engaging elements wherein the ground engaging elements are maintained substantially level regardless of the adjusted position of the implement.

A still further object of the invention is the provision of an improved supporting structure for agricultural implements whereby the implement may be quickly and easily attached to and detached from a tractor.

Another and more specific object of the invention is the provision of improved supporting means for tractor weeders and similar agricultural implements, wherein the teeth of the weeder are mounted for swinging movement while maintaining the ends thereof in parallel planes which are substantially level, and wherein means are provided for adjustably changing the inclination of such planes so that the ends of the teeth may be brought into proper engagement with the ground.

Still another object of the invention is the provision of improved supporting means for tractor weeders and the like whereby such implements may be quickly and easily attached to and detached from a tractor.

These and other objects and advantages of the invention will become more apparent when taken with the accompanying drawings and the following description, illustrating and describing the preferred embodiment of the invention.

In the drawings,

Figure 1 is a plan view of an agricultural implement embodying the invention,

Figure 2 is a side elevational view of the device shown in Figure 1,

Figure 3 is a partial vertical cross-sectional view of the device taken on line 3—3 of Figure 1, Figure 4 is a vertical cross-sectional view of a portion of the device taken through one of the supporting frames, and Figure 5 is a vertical sectional cross-sectional view of a portion of the device taken on line 5—5 of Figure 1.

The structure of the invention may be embodied in any suitable type of agricultural implement employing a plurality of ground engaging elements, but for the purpose of illustration is shown as embodied in a weeder of the tractor drawn type having a plurality of teeth 10 designed to engage and work the ground between rows of various types of crops. The teeth 10 are secured to parallel rails 11 by bolts 12 and nuts 13, as clearly shown in Figure 5, and depend therefrom for engagement with the ground.

The rails 11 extend transversely of the path of movement of the implement and are spaced apart from front to rear so that the teeth mounted thereon are arranged in successive parallel rows. In order to prevent sidewise creeping of the machine as it is being pulled over the ground the successive teeth of succeeding rows are offset inwardly from the ends to the center of the device as clearly shown in Figure 1.

The rails 11 are held in parallel spaced apart relationship by the straps 14 and supporting frames 15 hereinafter described. A V-shaped brace 16 may also be used adjacent the center of the machine for increased strength and rigidity. The braces 14 extend substantially transversely to the rails 11 from front to rear of the machine and are secured thereto by bolts and nuts 17 and 18. The V-shaped brace 16 is secured to the front and intermediate rails by bolts 19 and nuts 20.

Two of the supporting frames 15 are employed and are positioned intermediate the ends and center of the machine. Each of such frames may desirably be formed by bending a single strap or bar of material to provide a lower rail engaging portion 21, a forward upstanding portion 22, a rearwardly extending upper portion 23 and a downwardly and rearwardly inclined rear portion 24, as clearly shown in Figure 2. The end of the portion 24 may be welded to the portion 21 as at 25 to provide a unitary frame member. The lower portion 21 is secured to the rails 11 by U bolts 26 and nuts 27.

Mounted on the upper portion 23 of the frame 15 is a strap 30 having a bearing 31 welded to one end thereof as shown in Figure 3. A similar bearing 32 is welded to the frame member 15 at the junction of the portions 21 and 22. The strap 30 is provided with a plurality of pairs of openings 33, 34 and 35 which may be alternately aligned with openings 36 in the upper portion 23 of the frame member 15. By virtue of this construction the strap 30 may be adjustably positioned in a plurality of forwardly or rearwardly disposed locations with respect to the upper portion 23 and secured in a desired location by the bolts 37 and nuts 38.

The frames 15 are pivotally connected to bars 40 by parallel links 41 and 42. It should here be noted that the bars 40 are designed to be rigidly attached to a tractor to be supported thereby, preferably with the bars in a vertical, or approximately vertical, position. Each of the links 41 and 42 may desirably consist of a pair of bars or straps 43 having aligned openings 44 adjacent the ends thereof to receive bolts 45 passed respectively through the bearings 31 and 32 of the frames 15 and through openings 46 in the bars 40. In order to provide the desired parallel motion the openings 44 in the links 41 are spaced apart the same distance as the corresponding openings in the links 42 and the openings 46 in the bars 40 are spaced apart the same distance as the openings in the bearings 31 and 32. It will thus be apparent that when the bars 40 are rigidly connected to a tractor or the like the links 41 and 42 may swing upwardly and downwardly to position the ends of the teeth 10 in different parallel planes.

In order to adjust the elevation of the weeder teeth and limit penetration thereof into the ground while permitting them to swing freely in an upward direction, the upper links 41 of each pair are provided with adjusting means 47 consisting of lugs 48 depending from such links and carrying screws 49, screw-threadedly engaged therewith as at 50, and bearing against the bars 40, as clearly shown in Figures 2 and 3. The lugs 48 may be secured between the bars or straps 43 in a suitable manner such as by the rivets or bolts 51. It will be apparent that the screws 49 of the adjusting means 47 may be operated to swing the parallel links 41 and 42 for the adjustment referred to, the weeder teeth 10 bearing on the ground under the weight of the structure rearwardly of the bars 40 and with the screws 49 limiting the downward movement thereof.

*Operation*

In the use of the machine of the invention the bars 40 are secured to suitable supports or hitches on the tractor in such manner that they are held rigidly in substantially vertical positions. The screws 49 are then adjusted to permit the desired penetration of the teeth 10 into the ground. Assuming that the teeth 10 of the various rows are arranged substantially level the device is then ready to be used. If the teeth 10 are not disposed level for one reason or another, the straps 30 may be adjusted forwardly or rearwardly as required by removing the bolts 37 and selectively aligning one of the pairs of openings 33, 34 or 35 thereof with the openings 36 in the portion 23 and then reinserting the bolts.

As the weeder is pulled by the tractor the teeth 10 will penetrate the ground between the rows of crops to a depth depending upon the adjustment of the screw 49, the weight of the machine being sufficient to insure the desired penetration. However, when an obstruction is encountered or when the machine is being turned around at the end of the field the weeder is free to swing upwardly to permit passage of the teeth over such an obstacle or to permit turning. Furthermore, the teeth 10 will be free to move upwardly and downwardly over uneven ground but during such movement will always be maintained in a level position.

The device is very quickly and easily attached to a tractor and when once attached and adjusted properly will carry out its intended functions automatically. Such attachment is very readily carried out by inserting the ends of the bars 40 in the cultivator clamps of the rear tool bar. Alternatively the lower ends of the bars 40 may be bent forwardly and provided with openings for bolting underneath the cultivator frame.

It will thus be seen that the present invention provides an improved supporting and mounting means for weeders and other agricultural implements which is mounted for free swinging movement upwardly but which is limited as to its downward movement. Furthermore, the ground engaging elements of such implements are always maintained level and provision is made for adjustably leveling the device in the event it happens to be necessary.

While we have illustrated and described a preferred embodiment of the invention, we do not intend to be limited to the specific details thereof except as covered in the following claims.

We claim:

1. In a weeder having a plurality of ground engaging teeth, a frame for supporting said teeth comprising a strap bent to form a lower portion to which said teeth are secured, a forward upstanding portion, and a rearwardly extending substantially horizontal upper portion, a strap member adjustably secured to said upper portion, bearings carried by said strap member at the forward end thereof and by said frame member adjacent the junction of said lower and upwardly extending portions, parallel links pivotally secured to said bearings, and a bar pivotally secured to said parallel links at the ends thereof opposite their pivotal connections with said bearings.

2. In a weeder having a plurality of ground engaging teeth carried by a plurality of spaced rails, a pair of supporting frames for said teeth and rails each including a strap member bent to provide a lower rail engaging portion, a forward upstanding portion, an upper rearwardly extending portion, and a downwardly and rearwardly extending rear portion secured at its end to said lower portion, a strap member adjustably secured to said upper rearwardly extending portion of each frame, a pair of parallel links pivotally connecting each of said frames to a bar, one of said links being pivotally secured to the forward end of said strap member and the other of said links being pivotally secured to said frame at the junction of said lower portion with said forward upwardly extending portion, and depending lugs carried by one link of each pair and having adjustable means thereon for engagement with said bars to limit downward pivoting movement of said links.

3. In an agricultural implement having a plurality of spaced ground engaging elements, means supporting said elements including a pair of spaced frame members each having an upstanding portion thereon and a substantially horizontally disposed rearwardly extending portion, a strap adjustably secured to each of said rearwardly extending portions, a pair of parallel links connected at one of their ends to each strap and to the lower ends of said upstanding portions, a bar pivotally connected to the opposite ends of each of said pair of links, and adjustable means carried by the upper link of each pair and engageable with said bars to limit downward swinging movement of said links with respect to said bars.

4. A weeder comprising a plurality of spaced rails extending transversely of the normal path of movement of said weeder, a plurality of teeth suspended from said rails and arranged in successive rows from front to rear of the device with the teeth of succeeding rows offset inwardly from the ends to the middle of the device, a pair of frames secured to said rails and having a lower portion, an upwardly extending forward portion, a rearwardly extending upper portion, and a rearwardly and downwardly extending rear portion secured at its end to said lower portion, a strap adjustably secured to each of said upper rearwardly extending portions, bearings carried by the forward ends of said straps and by the lower ends of said upwardly extending portions, upper and lower parallel links pivotally secured to said bearings at one of their ends and to spaced bars at their other ends, lugs carried by said upper parallel links and depending downwardly therefrom, and adjustable means carried by said lugs and engageable with said bars to limit downward pivoting movement of said links.

References Cited in the file of this patent

UNITED STATES PATENTS

| 625,078 | Wright | May 16, 1899 |
|---|---|---|
| 1,265,902 | Gerhard | May 14, 1918 |
| 1,577,552 | Bailor | Mar. 23, 1926 |
| 1,980,470 | Brown | Nov. 13, 1934 |
| 2,298,161 | Robinson | Oct. 6, 1942 |
| 2,593,176 | Patterson | Apr. 15, 1952 |
| 2,593,679 | Kaupke | Apr. 22, 1952 |

FOREIGN PATENTS

| 598,547 | France | Sept. 29, 1925 |
|---|---|---|
| 43,668 | Netherlands | July 15, 1938 |